US006282222B1

(12) United States Patent
Wieser et al.

(10) Patent No.: US 6,282,222 B1
(45) Date of Patent: Aug. 28, 2001

(54) ELECTRON BEAM IRRADIATION OF GASES AND LIGHT SOURCE USING THE SAME

(75) Inventors: Jochen Wieser; Andreas Ulrich, both of Munich (DE); Daniel E. Murnick, Bernardsville, NJ (US); Werner Krötz, Munich (DE)

(73) Assignee: Rutgers, The State University, New Brunswick, NJ (US)

( * ) Notice: Subject to any disclaimer, the term of this patent is extended or adjusted under 35 U.S.C. 154(b) by 0 days.

(21) Appl. No.: 09/390,062

(22) Filed: Sep. 3, 1999

Related U.S. Application Data

(62) Division of application No. 08/873,957, filed on Jun. 12, 1997, now Pat. No. 6,052,401.
(60) Provisional application No. 60/019,592, filed on Jun. 12, 1996.

(51) Int. Cl.$^7$ ............................. H01S 3/0959; H01S 3/225
(52) U.S. Cl. ................................................. 372/74; 372/57
(58) Field of Search ........................................ 372/74, 57

(56) References Cited

U.S. PATENT DOCUMENTS

| | | | |
|---|---|---|---|
| 4,203,078 | * 5/1980 | Daugherty et al. | 372/74 |
| 4,238,742 | * 12/1980 | Champagne | 372/74 |
| 4,494,036 | 1/1985 | Neukermans | 313/420 |
| 4,591,756 | 5/1986 | Avnery | 313/420 |
| 5,391,958 | * 2/1995 | Kelly | 313/420 |

FOREIGN PATENT DOCUMENTS

| | | |
|---|---|---|
| 4438407 C2 | 5/1996 | (DE) . |
| 60-136157 | 7/1985 | (JP) . |
| 63-16546 | 1/1988 | (JP) . |

OTHER PUBLICATIONS

Robert et al., Energetic High Repetition Rate Flash X–Ray Source: Application to UV–VUV Fluorescense Studies in High Pressure Gases, pp. 237–244, International Conference on Phenomena in Ionized Gases, Sep. 19–24, 1993.

Ulrich et al., Heavy–ion excitation of rare–gas excimers, J. Appl. Phys. 62(2), Jul. 15, 1987, ©1987 American Institute of Physics, pp. 357–361.

Sauerbrey, R. et al., Fluorescence and absorption in electron beam excited argon, J. Phys. B: At. Mol. Phys. 17 (1984), ©1984 The Institute of Physics, pp. 2057–2074. (No month).

Kogelschatz, Silent–dischage driven excimer UV sources and their applications, Applied Surface Science 54 (1992), °1992 Elsevier science Publishers B.V., pp. 410–423. (No month).

Hanlon et al., Electron window cathode ray tube applications, J. Vac. Sci. Technol. B 4(1), Jan./Feb. 1986, ©1986 American Vacuum Society, pp. 305–309.

Anuchin, et al., Efficiency of pumping of gaseous media by fission fragments, Sov. Tech. Phys. Lett. 18(3), Mar. 1992, ©1992 American Institute of Physics,pp. 164–165.

Dubeć et al., Supersonic cooling of rare–gas excimers excited in d discharges, Dec. 1, 1991, Vo. 16, No. 23, Optics Letters, ©1991 Optical Society of America, pp. 1887–1889.

Kern et al., Thin Film Processes: Chemical Vapor Deposition of Inorganic Thin Films, ©1978 by Academic Press, Inc., pp. 257–258 ans pp. 298–301. (no month).

Brochure, Heraeus Excimer UV Lamps, The Source of Innovation! A Quantum Step Forward in UV Technology, pp. 1–10. (No month).

Wieser et al., Vacuum ultraviolet rare gas excimer light source, Rev. Sci. Instrum. 68 (3), Mar. 1997, ©1997 American Institute of Physics, pp. 1360–1364.

* cited by examiner

*Primary Examiner*—James W. Davie
(74) *Attorney, Agent, or Firm*—Lerner, David, Littenberg, Krumholz & Mentlik, LLP

(57) ABSTRACT

Excimers are generated by directing an electron beam at about 5 KeV to about 40 KeV into an excimer forming gas such as He, Ne, Ar, Kr, and Xe or mixtures of these with other gases through a ceramic foil such as $SiN_x$. Vacuum ultraviolet (VUV) light is emitted by the excimers or by other species in contact therewith. The invention can provide intense, continuously operable broadband or monochromatic VUV light sources.

18 Claims, 6 Drawing Sheets

ELECTRON BEAM IRRADIATION OF GASES AND LIGHT SOURCE USING THE SAME

CROSS REFERENCE TO RELATED APPLICATIONS

The present application is a divisional of U.S. patent application Ser. No. 08/873,957, filed Jun. 12, 1997, now U.S. Pat. No. 6,052,401 and claims benefit of U.S. Provisional Application No. 60/019,592, filed Jun. 12, 1996, the disclosure of which is hereby incorporated by reference herein. The disclosure of German published patent application P 4438407.6-33 published May 2, 1996 (DE 4438407) is also incorporated by reference herein.

FIELD OF THE INVENTION

The present invention relates to methods and apparatus for generating excited species, particularly excimers in gases and to light sources, particularly ultraviolet light sources employing excimers.

BACKGROUND OF THE INVENTION

There has been a need for improved light sources capable of generating ultraviolet light in the spectral region between about 50 and 200 nanometers wavelength, commonly referred to as the "vacuum ultraviolet" or "VUV" region. VUV photons have energies on the order of 10 electron volts (10 ev) and are capable of breaking chemical bonds of many compounds. Thus, VUV light can be used to accelerate chemical reactions as in light enhanced chemical vapor deposition curing of photosensitive materials, production of ozone and cracking gaseous waste products. Moreover, the minimum feature size which can be imaged with light is directly proportional to the wavelength of the light. VUV light has the shortest wavelength of any light which can be focused and reflected with conventional optical elements. Therefore, photographic processes employing VUV light can image smaller feature sizes than those imaginable with other light wavelengths. This is of particular importance in photographic processes used to fabricate semiconductors.

Additional needs exist for broadband VUV light sources, i.e., light sources which emit the VUV light over a continuum of wavelengths within the VUV range. A broadband source can be used for absorption spectroscopy in the VUV range. Because gases such as hydrogen and oxygen have resonance lines in this range, VUV absorption spectroscopy can be used for sensitive analytical measurements. A light source for use in spectroscopy desirably can operate continuously, with stable emission characteristics over time. A stable, continuously operable broadband VUV source is also needed for use as a calibration standard, for measuring the sensitivity of VUV light detection systems in laboratory apparatus.

No truly satisfactory broadband VUV light source has been available heretofore. Deuterium arc lamps have been used. However, such lamps emit a relatively weak continuum or broadband radiation in the VUV range together with intense line radiation at particular wavelengths. This spectral characteristic requires that the detector system used to measure the light have a very high dynamic range, i.e., the capability of measuring a weak light at some wavelengths and very intense light at others.

Some consideration has been given to the use of excimer radiation as a source of VUV light. Excimers are temporary chemical compounds composed of atoms which normally do not combine with one another. One or more of the atoms constituting an excimer is in an excited state, i.e., a state in which the electrons have been momentarily promoted to a high-energy state. The excimer molecule as a whole is also in an excited state, and will ultimately decay to yield the constituent atoms. For example, elements commonly referred to as inert gases, helium, neon, argon, krypton and xenon, which normally exist only as isolated atoms can form excimer molecules when in the excited state. Diatomic inert gas excimers such as $Ar_2^*$, $Kr_2^*$, and $Xe_2^*$ emit broadband continuum radiation in the VUV range. However, to form these excimers in appreciable quantities, it is necessary to provide excitation energies on the order of 10 to 40 electron volts per atom. Moreover, this excitation energy must be provided while the gas is maintained at relatively low temperatures, typically below 200° C. and most typically about room temperature. The gas also should be maintained under appreciable absolute pressure, desirably at least about 100 millibar (mbar) and most preferably about 0.5 bar or more, i.e., most preferably at about atmospheric pressure or more. Such substantial gas pressure is needed to provide a dense gas, which facilitates the excimer forming reactions. A simple direct current electrical arc discharge is ineffective to form excimers under these conditions. Other specialized arc discharge arrangements such as surface barrier discharges or arcs applied in short pulses cannot produce excimer light, these devices operate only intermittently and do not provide stable, continuous emission.

Excimers have been produced by applying beams of energetic particles, particularly electron beams, to the gas. However, the gas must be at substantial pressure as discussed above, whereas electron beams typically must be formed and focused in a high vacuum. Therefore, it is necessary to inject the electron beam into the gas to a thin region or "window" in the wall of the gas-containing chamber. Metal windows such as titanium foils have been used for electron beam windows heretofore. However, because these windows must withstand the gas pressure, they must have appreciable thickness, typically about two microns or more for a window diameter of about 5 millimeters. For efficient penetration of such a titanium foil, the electrons in the beam must have energies above 100 KeV. Electron accelerators capable of generating electron beams with these beam energies are bulky and expensive and impractical for use in a light source. Perhaps for these reasons, formation of excimers by injection of electron beams have been confined heretofore to basic laboratory research studies and has not found practical application.

Accordingly, there is still a significant, unmet need for improved broadband VUV light sources. There are other, corresponding needs for improved monochromatic VUV sources, particularly at the shorter-wavelength end of the VUV spectrum. Moreover, transient species including inert gas atoms and other atoms in excited metastable states, as well as highly reactive chemical species such as single atoms of normally diatomic gases can be used to facilitate chemical reactions. The transient species store energy which drives the chemical reactions. For example, low-pressure plasmas are commonly used to form reactive species such as monatomic hydrogen, which in turn is reacted with a workpiece such as a semiconductor wafer to etch the wafer or to strip photoresist therefrom. However, plasma processes generally operate at very low pressures and produce low densities of transient species, which limits the speed of the reaction. Thus, there are also needs for improved methods of making transient species.

SUMMARY OF THE INVENTION

One aspect of the present invention provides methods of generating excimers or other transient species. Methods according to this aspect of the invention include the step of generating a low energy electron beam, i.e., a beam of electrons having energies less than about 100 KeV, preferably between about 5 KeV and about 40 KeV, more preferably about 10 to about 30 KeV, and most preferably at or about 20 KeV. The method further includes the step of directing the low energy electron beam through a ceramic foil window or another window substantially permeable to the low energy electrons into a gas to form excimers or other transient species in the gas. The excimers or other transient species can decay and produce light, in which case the method can be used as a method of producing light.

The gas desirably includes a first gas selected from the group consisting of inert gases (He, Ne, Ar, Kr, Xe and mixtures thereof). Although the present invention is not limited by any theory of operation, it is believed that the inert gas atoms efficiently accept energy from the beam. Excited inert gas atoms can form diatomic inert gas excimers, which decay to yield VUV light. The gas may include a second gas such as a halogen, and the process may form mixed excimers of the first and second gases. The mixed excimers may also decay to yield light. Alternatively, the gas may include a second gas which received energy from the excimers of the first gas or from excited atoms of the first gas to form transient species other than excimers. Transient species formed from the first as or from a second gas, where present, may by used to facilitate chemical reactions. For example, the second gas may include hydrogen and the transient species formed may include monatomic hydrogen in a metastable excited state, which decays to yield ground-state monatomic hydrogen as a further transient species.

The ceramic foil window preferably is selected from the group consisting of carbides, nitrides, hydrides and oxides of metals selected from the group consisting of silicon, aluminum and boron and combinations of these materials. Polysilicon may also be employed as a beam window. Particularly preferred foil materials include those selected from the group consisting of silicon nitride, silicon carbide, and polysilicon. The foil desirably is about 100 to about 300 nm thick. The foil should be substantially transparent to electrons in the low-energy range discussed above. Preferably, the window does not absorb more than about 5% of the energy in a 20 KeV electron passing through it.

To favor excimer production the gas is maintained under an absolute pressure of at least about 0.1 bar, more preferably at lest about 0.2 bar, most preferably at least about 0.5 bar and, particularly, about 0.5 to about 30 bar. In general, higher pressures are preferred. As more fully discussed below, higher gas pressure tends to minimize the effect of any impurities present in the gas. However, the step of generating the electron beam generally is performed in a vacuum and the foil window maintains the excimer-forming gas separate from the vacuum. Therefore, the upper limit of gas pressure is set by the amount of pressure that can be sustained by the foil. With typical foils, pressures of about 1-2 bar can be used.

The aforementioned methods may be used in a method of generating broadband VUV light. In preferred methods according to this aspect of the present invention, the gas subjected to the electron beam radiation is contained in a chamber which is a least partially transparent to the VUV light as, for example, a chamber having a $MgF_2$, LiF, or quartz light window as one part of the chamber wall. The gas desirably consists essentially of one or more gases selected from the group consisting of helium, neon, argon, krypton, and xenon, and most preferably one or more gases selected from the group consisting of argon, krypton and xenon.

The electron beam may be applied in pulses or, most preferably, may be applied continually at a constant beam current. With constant beam current, the method provides a constant-intensity, high quality VUV light with a broadband spectrum characteristic and with no sharp peaks.

Further aspects of the present invention provide a light source comprising an emission chamber at least partially transparent to VUV light, the emission chamber having a window transparent to low energy electrons. The light source further includes a source of low energy electrons and an excimer forming gas disposed within the chamber. The gas, electron beam and foil window may be selected as discussed above in connection with the method.

Still further aspects of the present invention provide components for use in a light source. Components according to this aspect of the present invention includes a chamber having a wall structure including a ceramic or other window substantially transparent to low energy electrons below about 100 KeV and also having a light-window portion substantially transparent to light. Most preferably, the light-window portion is substantially transparent to VUV light. The component desirably further includes an excimer forming gas sealed within the chamber. The component may further include meads for purifying the excimer forming gas sealed within the chamber.

A method of generating light according to a further aspect of the invention includes the step of generating a beam of low energy electrons at less than about 100 KeV and most preferably about 5 to about 40 KeV and directing this beam through a ceramic foil window as discussed above into a mixture of first and second gases for form excimers in the first gas so that the excimers of the first gas interact with the second gas and form secondary excited species. The secondary excited species decay and emit light. The secondary excited species may include excited atoms of the second gas. In a particularly preferred method according to this aspect of the invention, the first gas is neon and the second gas is hydrogen. The secondary species include excited monatomic hydrogen and the light emitted by the secondary species is at about 121 nm. This constitutes the Lyman-α radiation of monatomic hydrogen. Methods according to this aspect of the present invention provide essentially monochromatic light at about 121 nm, i.e., at about the shortest wavelength compatible with conventional optical components. In preferred methods according to this aspect of the invention, a substantial part of the energy absorbed by the first gas is transferred to the second gas; it is believed that approximately 10% to 15% of the energy absorbed by the first gas is transferred to the second gas. At least with the light window materials used to date, the broadband emission associated with decay of $Ne_2^*$ excimers is not seen. Instead the monochromatic emission constitutes essentially all of the light radiation emitted by the system through the window. The reaction of $Ne_2^*$ excimers with hydrogen to provide light, itself constitutes a further aspect of the present invention, regardless of the manner in which the excimers are formed. However, here again the excimers are preferably formed by application of an electron beam, most preferably in the manner as discussed above.

According to yet another aspect of the present invention, a method of generating light utilizes a low energy electron beam as discussed above directed into a gas mixture containing first and second gases through a window to produce mixed excimers incorporating atoms from the first and second gases and these mixed excimers emit light. In a method according to this aspect of the present invention, the first gas desirably is selected from the group consisting of inert gases (He, Ne, Ar, Kr, and Xe) whereas the second gas desirably is selected from a group consisting of halogen and halogen containing compounds. The mixed excimers preferably are diatomic, inert-gas and halogen excimers. Particularly preferred halogen containing compounds are halogenated hydrocarbons, most preferably, fully halogenated hydrocarbons having fewer than four carbon atoms. A particularly preferred hydrogen and halogen containing compounds are fluorine and fluorine containing compounds, whereas the first gas may consist essentially of Ar. The resulting ArF excimers remit at about 193 nm. This aspect of the present invention yields light concentrated in a narrow band of wavelengths.

Still further aspects of the present invention provide lasers and laser components utilizing electron beam excitation. Thus, a laser component according to this aspect of the present invention may include an emission chamber having a pair of opposite ends and means for reflecting light of a selected wavelength at the ends so that the selected wavelength will pass repeatedly along a predetermined path in an axial direction between the ends. The component may further include an electron beam window partially bounding the chamber and being substantially transparent to a low energy electron beam. The beam window is configured and aligned with the predetermined path so that an electron beam window may be introduced into the chamber and pass through an elongated excitation zone within the chamber encompassing the path. Preferably, the beam window extends along a wall of a chamber in an axial direction and hence extends substantially parallel to the path. The beam window may be in the form of an elongated strip extending in the axial direction. The laser may include a component as discussed above together with an electron beam gun adapted to produce a flat electron beam having a wide dimension aligned with the axial direction of the path. Where an elongated strip-shaped window is used, the wide dimension of the beam from the gun is aligned with the strip. In a particularly preferred arrangement, a laser according to this arrangement includes a gas mixture an inert gas and a halogen-containing gas in the chamber.

These and other objects, features and advantages of the present invention will be more readily apparent from a detailed description of the preferred embodiments set forth below taken in conjunction with the accompanying drawings.

DETAILED DESCRIPTION OF THE PREFERRED EMBODIMENTS

Figure 1:
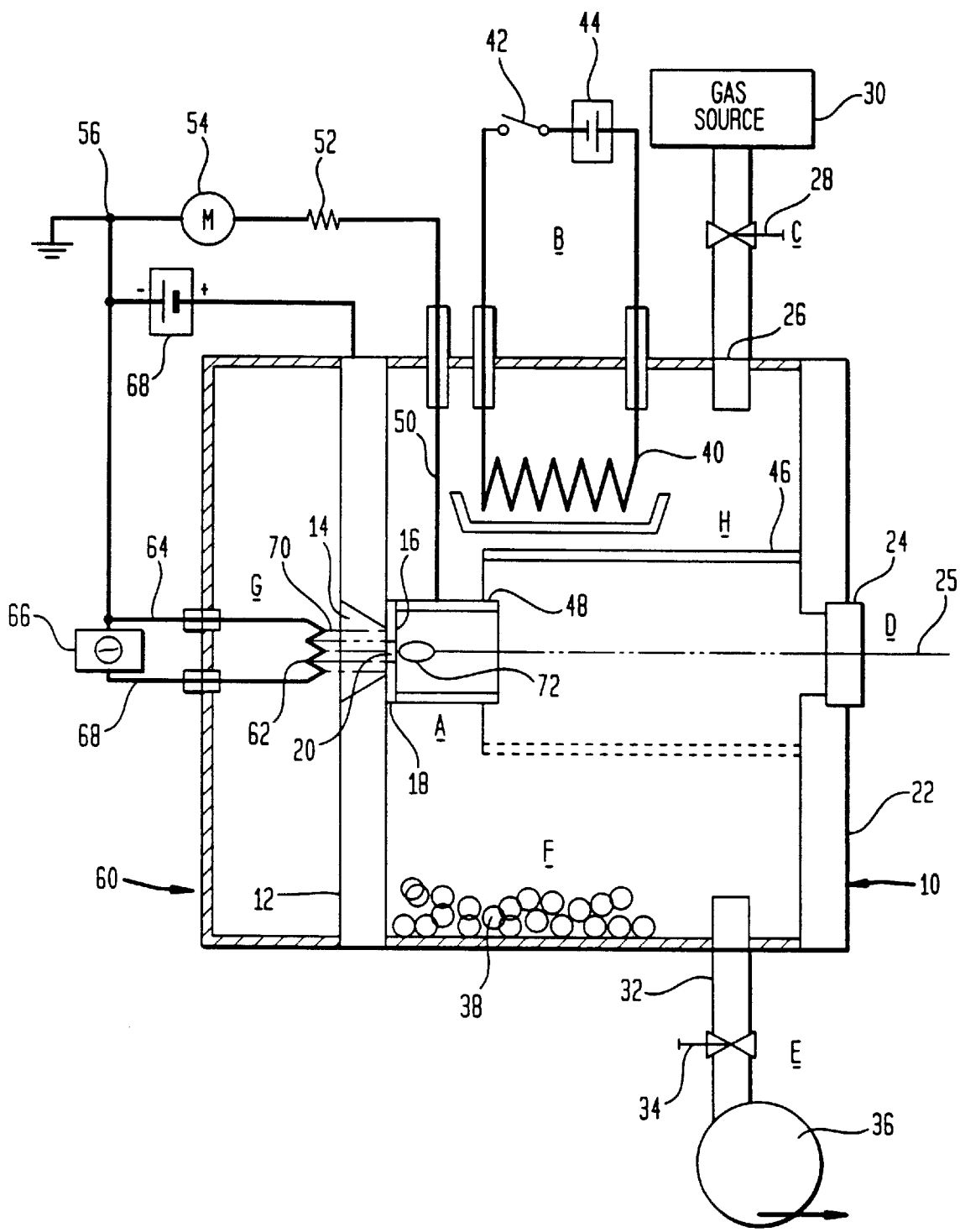
FIG. 1 is a diagrammatic sectional view depicting apparatus according to one embodiment of the invention.

Apparatus as depicted in FIG. 1 includes an emission chamber 10 having a metallic wall 12 with a hole 14 therein. A frame 18 is provided with a hole 20 and a thin ceramic film 16 overlying one face of the frame and overlying hole 20. Frame 18 is mounted to wall 12 so that hole 20 is aligned with hole 14. Frame 18 and foil 16 cooperatively seal hole 14 in wall 12 and form a gas-tight but electron permeable opening in the wall. Ceramic film 16 in a film substantially transparent to electrons in the low energy range utilized in the apparatus. The electron absorption and scattering characteristics of foil 16 are selected so that no more than about 10%, and most preferably no more than about 5% of the energy in the electron beam will be absorbed in the foil. Preferably, film 16 is formed from a material selected from the group consisting of carbides, nitrides, hydrides and oxides of metals selected from the group consisting of silicon, aluminum and boron in combinations of these materials. Mixed compounds such as nitride hydrides, nitride carbides and carbide hydrides may also be employed. Silicon nitride and silicon carbide may be employed. Another preferred material is polysilicon, i.e., silicon with a disordered structure which can be regarded as polycrystalline or noncrystalline. Film 16 desirably is about 100 to about 300 nm thick, most preferably, about 200 nm thick with typical materials as discusses above. The lower limit of membrane thickness is the minimum thickness needed to provide a substantially pinhole free, gas impermeable membrane which as sufficient strength to withstand the stresses imposed upon the membrane in service. The minimum foil thickness will vary somewhat with the dimensions of hole 20 in frame 18 and with the gas pressure to be utilized within emission chamber 10. In one embodiment, hole 20 is about 1 mm by about 1 mm, whereas hole 14 in plate 12 is circular and about 3.5 mm in diameter.

Suitable foils are commercially available from suppliers including Kevex, division of Fisons, Inc. of Valencia, Calif. Techniques for limiting mechanical stresses in an electron beam permeable membrane are disclosed in U.S. Pat. No. 5,391,958, the disclosure of which is hereby incorporated by reference herein. Membrane 16 can also be formed by the techniques discussed in Chemical Vapor Deposition Of Inorganic Thin Films by W. Kern and V. S. Ban, in Thin Film Processes, J. L. Vossen and W. Kern, editors, New York, Academic Press, 1978, the disclosure of which is also incorporated by reference herein.

In one exemplary technique a (100) Si wafer is coated on both sides with amorphous $SiN_x$. The $SiN_x$ is deposited by CVD from a mixture of $NH_3$ and $SiCl_2H_2$ at 700° C. to a thickness of =300 nm. The stoichiometry is controlled by varying the dichlorosilane:ammonia ratio. This also controls the intrinsic stress in the film, which was nominally set at =250 Mpa (tensile). The use of low stress, non-stoichiometric $SiN_x$ prevents the windows from fracturing under their own stress, which can occur if stoichiometric $Si_3N_4$ is used.

Windows and cleave lines are defined on the back of the wafer photolithographically, and are opened up in the $SiN_x$ by reactive ion etching in $CF_4$. In the photolithographic step, the windows are aligned carefully to the <110> directions to ensure that the edges of the etched Si are free of large steps, which otherwise act as crack nucleation sites and would dramatically reduce the strength of the window.

The wafer is then etched in ethylenediamine pyrocathechol (EDP)—an anisotropic etch that terminates on the [111] planes of the Si. This etch also exhibits a very high degree of selectively between the $SiN_x$ and the Si wafer.

Once the Si has been etched all the way through to the $SiN_x$ the individual windows can be broken out by pressing on the etched cleave lines. The windows are then ready to use. This technique yields $SiN_x$ film windows already mounted on Si frames.

If the window is to be used with a halogen-containing gas, it should be covered with a thin coating, preferably less than 30 nanometers, of chromium or other material resistant to attack by active halogen species.

Chamber 10 has a further wall 22 with an ultraviolet light transmissive window 24. Light window 24 may be formed from materials such as $MgF_2$, LiF, quartz or any other material which is substantially transparent or translucent to light in the VUV range. Light window 24 is aligned with the window 16 and hole 20 on a common axis 25. The remaining wall structure of chamber 10 may be formed from essentially any material which is substantially gas impermeable and which is substantially nonreactive with the gases employed within the chamber. Emission chamber 10 is connected by a gas evacuation port 26 and sealing valve 28 to a gas source 30. An evacuation port 32 and sealing value 34 connect the interior of chamber 10 with vacuum pump 46. A desiccant or moisture absorber 38 is provided within the interior of chamber 10. A getter in the form of a thin wire 40 of titanium or other material reactive with oxygen and nitrogen is also disposed in chamber 10. Wire 40 is connected through a switch 42 to a getter power supply 44. Gas-tight feedthroughs are provided for the electrical connections. A shield 46 is provided in proximity top wire 40. Shield 46 is arranged to catch any atoms sputtered off of wire 40 when the wire is heated as discussed below. An open-ended, cylindrical metallic current collector tube 48 is mounted in the cell around axis 25 in the vicinity of film 16. Current collector 48 desirably is insulated from metallic wall 12 by the ceramic film 16. Current collector 48 is connected by a lead 50 extending through a sealed, insulating pass through to the outside of the chamber. Lead 50 in turn is connected through a 100 Kohm resistor 52 and current meter 54 to the system ground 56. Current collector 48, lead 50, resistor 52 and meter 54 are used for monitoring the beam current. If monitoring capability is not required, these components may be omitted.

The apparatus further includes an electron acceleration chamber 60 separated from emission chamber 10 by wall 12. The interior of electron acceleration chamber 60 is sealed from the interior of emission chamber 12 by film 16. A cathode 62 in the form of a fine wire is provided within beam acceleration chamber 60, in alignment with axis 25. Cathode 62 is connected by lead 64 to ground node 56. A cathode heating power source 66 is connected between lead 64 and lead 68 at the opposite end of cathode 62. The cathode heating power supply may be a transformer having a primary coil for power input, a secondary coil connected to leads 64 and 68 and insulation adapted to resist high voltages. A variable reactance device such as a regulating autotransformer commonly sold under the trademark Variac may be connected between the primary coils of the cathode power supply and conventional mains power as, for example, 110 volts AC.

A high voltage potential source 68 is connected between ground node 56 and metallic wall 12. The positive side of high voltage source 68 is connected to wall 12, so that wall 12 serves as an anode to attract electrons from cathode 62. Cathode 62, cathode power supply 66, and high voltage power supply 68 may be similar to those used in common television cathode ray tubes. Thus, high voltage power supply 68 is arranged to apply between about 20 and about 40 KeV between the cathode and anode, and most preferably, about 30 KeV, although higher voltage levels can be employed. The cathode power supply is arranged to apply up to about 10 watts at about 8 volts to cathode 62. The interior of chamber 60 is evacuated and permanently sealed. Preferably, the pressure within chamber 60 is less than about $10^{-5}$ mbar and more preferably less than about $10^{-7}$ mbar. Conventional electron-gun components such as charged plates, electromagnets and permanent magnets (not shown) can be provided for focusing the electron beam emitted by the cathode and aligning the beam with the beam window.

In a method according to one embodiment of the invention, the interior of emission chamber 10 is evacuated to about $10^{-4}$ mbar using pump 36 and port 32 and maintained at about 110° C. while the low pressure is maintained by continued operation of pump 36. This initially frees the cell of gross water contamination. Cell 10 is momentarily opened as by removing wall 22 and a charge of molecular sieve 38 is loaded into the cell. Prior to loading, molecular sieve 38 is baked at about 600° C. under vacuum in a separate system so as to bring it to an extremely low water vapor content. Following these initial steps, the cell is purged with an inert gas selected from the group consisting of helium, neon, argon, krypton and xenon and this gas is allowed to flow through the cell to pump 36 or a few minutes to thoroughly flush the cell and remover most races of atmospheric air and other contaminating gases from the interior of the cell. After purging, the pressure of the gas within the chamber is brought to the desired working pressure. Typically, pressures of about 1.7 bar and about 2 bar can be used, although other pressures in the ranges discussed above can be employed.

After the gas is brought to the desired pressure within chamber 10, chamber 10 is sealed by shutting vales 34 and 28. Ports 26 and 32 can be sealed by other means, as by crimping or melting the tubing constituting the ports. After the chamber is sealed, the charge of gas reaches equilibrium with molecular sieve 38. Stated another way, any water vapor which may be present in the gas as a contaminant is removed by the molecular sieve until the pressure of water vapor reaches equilibrium with the molecular sieve. This results in a partial pressure of water vapor which is quite low. Switch 42 is closed to apply power from source 44 to getting wire 40, thereby heating the getting wire to about 800° C. This temperature is maintained for a few minutes. The metal of wire 40 reacts with any oxygen and nitrogen which may be present in the gas charge to form titanium nitride and titanium oxides. Shield 46 blocks sputtering or other deposition from wire 40 onto the other components of the device, particularly beam window 16 and light window 24. Where the wall structure of chamber adjacent wall 40 is transparent to visible light or infrared light, the temperature of wire 40 can be monitored by using a conventional optical pyrometer and the current applied by source 44 can be adjusted to maintain the desired temperature. The combined actions of getting wire 40 and molecular sieve or desiccant 38 essentially free the gas within chamber 10 from water vapor, oxygen and nitrogen. Preferably, the gas introduced into the chamber from source 30 is a high grade research-quality gas. However, even these gases may include some contaminant gases and it is highly desirably to purify the gases within the chamber after sealing the chamber. This minimizes the effects of any such impurity gases and also compensates for the normal contamination of the gases which arises from ordinary gas-handling operations such as piping the gas through tubing and/or fittings into chamber 10.

High voltage power supply 68 is actuated to apply a potential of about 30 KeV between cathode 62 and anode or plate 12. The cathode current applied by source 66 heats cathode 62 to incandescence and electrons are emitted from cathode 62 by conventional thermionic emission, also referred to as glow emission. The electrons emitted from cathode 62 are attracted by anode 12 and thus accelerated to form an electron beam 70 impinging on foil 16. The electron beam penetrates the foil and enters the gas within chamber 10. This causes formation of excimers in a relatively small region 72 immediately adjacent to foil 16. The entering electrons also produce a space charge on the gas within chamber 10 in the vicinity of foil 16. Because foil 16 is electrically insulating, the space charge does not dissipate to anode 12. With continued operation of the electron beam gun, the space charge reaches equilibrium. In this condition, the potential of the gas within current collector 48 is on the order of 1 KeV. After the system reaches equilibrium, the accumulation of negative charge in the gas is balanced by current flow from current collector 48 for lead 50 and meter 54 back to ground. Thus, the reading of meter 54 provides a direct indication of the beam current applied to the gas. Greater beam currents tend to provide greater emitted light. However, the maximum beam current which can be applied is determined by the characteristics for film 16. Even the relatively small proportion of electron beam power absorbed in the film tends to heat the film. Therefore, the beam current cannot be increased indefinitely without destroying the film. The exact beam current which can be accommodated depends in part upon the duty cycle of the apparatus. Thus, if a constant current is to be maintained for prolonged time (continuous duty cycle), the beam current typically does not exceed about 5 $\mu A/mm^2$ of foil.

Figure 2:
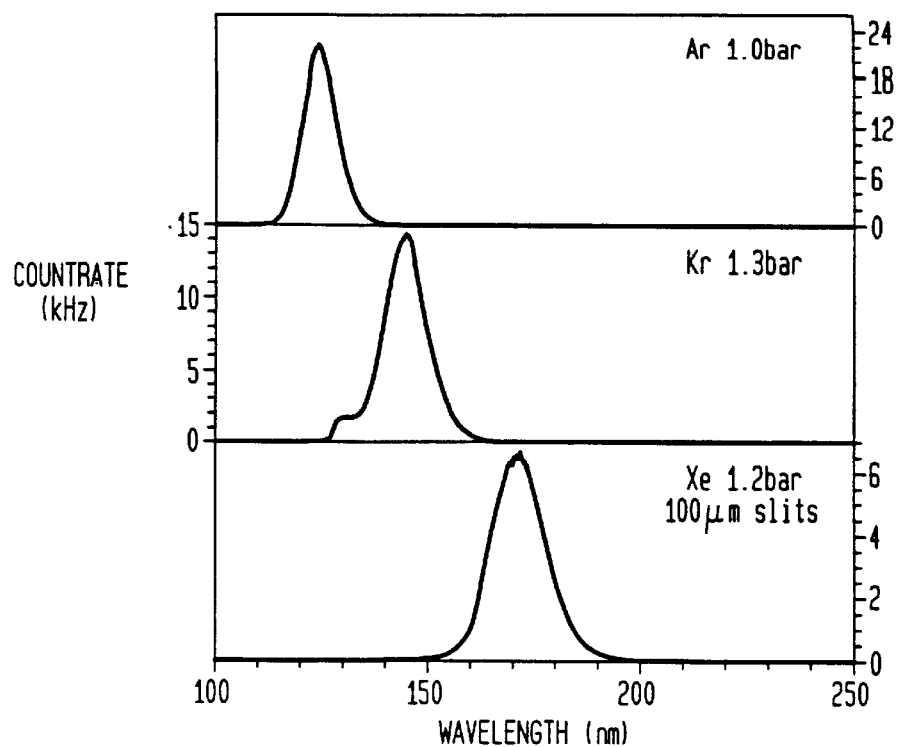
FIGS. 2 and 3 are sets of spectra.

The electron beam entering the gas in chamber 10 causes formation of excimers in the gas. The decaying excimers emit ultraviolet light. The spectral characteristics of the ultraviolet light will depend in large measure on the gas which is used. Typical spectra for argon at 1.0 bar; krypton at 1.3 bar and xenon at 1.2 bar absolute pressure are depicted in FIG. 2. In FIG. 2, the vertical axis labeled as "current rate" is a measure of light intensity. Typically, the various gases emit in the spectral ranges indicated in Table 1 below.

TABLE I

| Gas | Wavelength (nm) |
|---|---|
| Helium | 60–100 |
| Neon | 80–100 |
| Argon | 105–280 |
| Krypton | 125–155 |
| Xenon | 150–190 |

The valve given in Table 1 for argon include the so-called "third continuum" actually a very weak emission. Typically, the emission from argon includes intense light in the range of about 105 to about 140 nm wavelength. As best seen from inspection of FIG. 2, essentially any wavelength in the VUV range from about 120 to about 200 nm can be provided using argon, krypton or xenon. Shorter wavelengths, down to about 60 nm, can be provided using helium or neon. However, the $MgF_2$, LiF, or quartz windows discussed above do not effectively transmit light at these wavelengths. Very thin silicon, typically less than 100 nanometers thick, can be used to transmit light at these wavelengths. To limit the mechanical stress on the thin window, a further chamber can be provided on the output side of the thin window, and this further chamber can be pressurized with a gas such as an inert gas which is substantially transparent to the emitted light, so that the pressure in both chambers is equal. A workpiece to be treated by the emitted light may be disposed within this further chamber. Alternatively, the light window may be omitted entirely so that the emitted light is confined within the emission chamber. A workpiece to be treated by the emitted light may be disposed within the emission chamber.

EXAMPLE 1

Light produced using apparatus as shown in FIG. 1, was transmitted through $MgF_2$ window and detected using a VUV-monochromator (McPherson, Model 218) and a low noise VUV photo-tube (Hamamatsu R1080) operated in the photon counting mode. The monochromator slit width was calibrated by varying one slit at a time and fitting linear functions to the detected light intensity of a broad band light source versus slitwidth. A relative sensitivity calibration of the monochromator detector system was performed using a deuterium lamp as a light source. Absolute calibration was obtained by using a halogen lamp as a light source. Absolute calibration was obtained by using a halogen lamp with a known spectral emissivity in an overlapping spectral of the halogen and the deuterium lamp between 250 to 300 nm. Thus an absolute measurement of the photon flux could be performed for determining the efficiency of the excimer light source. Research grade gas (argon 6.0, krypton 4.8, xenon 4.8) was used. Stainless steel tubes and fittings (Swagelok) as well as hermetically sealed stainless steel valves were used for the gas system. Due to the epoxy glue, which was used for sealing the entrance foil and the $MgF_2$ window, the emission chamber could only be heated to a maximum temperature of 110° C. The cell was pumped to about $10^{-4}$ mbar for typically eight hours at this temperature using a turbomolecular pump. Then the cell was flushed with the rare gas for about two minutes and then filled to the working pressure and sealed off. The titanium wire was heated to about 800° C. This temperature was achieved by running an electrical current through the wire and adjusted by estimating the color temperature of its thermal light emission. Residual water vapor was removed using a few grams of molecular sieve which had been baked at 600° C., under vacuum, for one hour in a separate vacuum system. Handling of the molecular sieve was performed in air for one minute while the molecular sieve was loaded into the chamber. A test of the purification system showed that a factor of three in intensity increase could be obtained by using the hot titanium wire and another factor of three with the molecular sieve in the cell in comparison with continue flow of gas from the gas cylinder through the emission cell.

Emission spectra of the heavier rare gases argon, krypton, and xenon at about atmospheric pressure and excited by a 20 KeV low energy electron beam using the experimental setup described above are shown in FIG. 2. The emission spectra are dominated by the so called second excimer continua which originate from the radiative decay of the lowest lying excimer states $^1\Sigma_u$ and $^3\Sigma_u$ of the pure rare gases to the repulsive ground state. The so called first continuum can be seen as a shoulder on the short wavelength side of the second continuum of krypton and a very weak shoulder on xenon. Its detailed shape is modified by absorption due to an asymmetric pressure broadening of the first resonance lines of krypton in a forthcoming paper. Note that the corresponding structure cannot be observed for argon due to the cutoff of the $MgF_2$ window.

Figure 3:
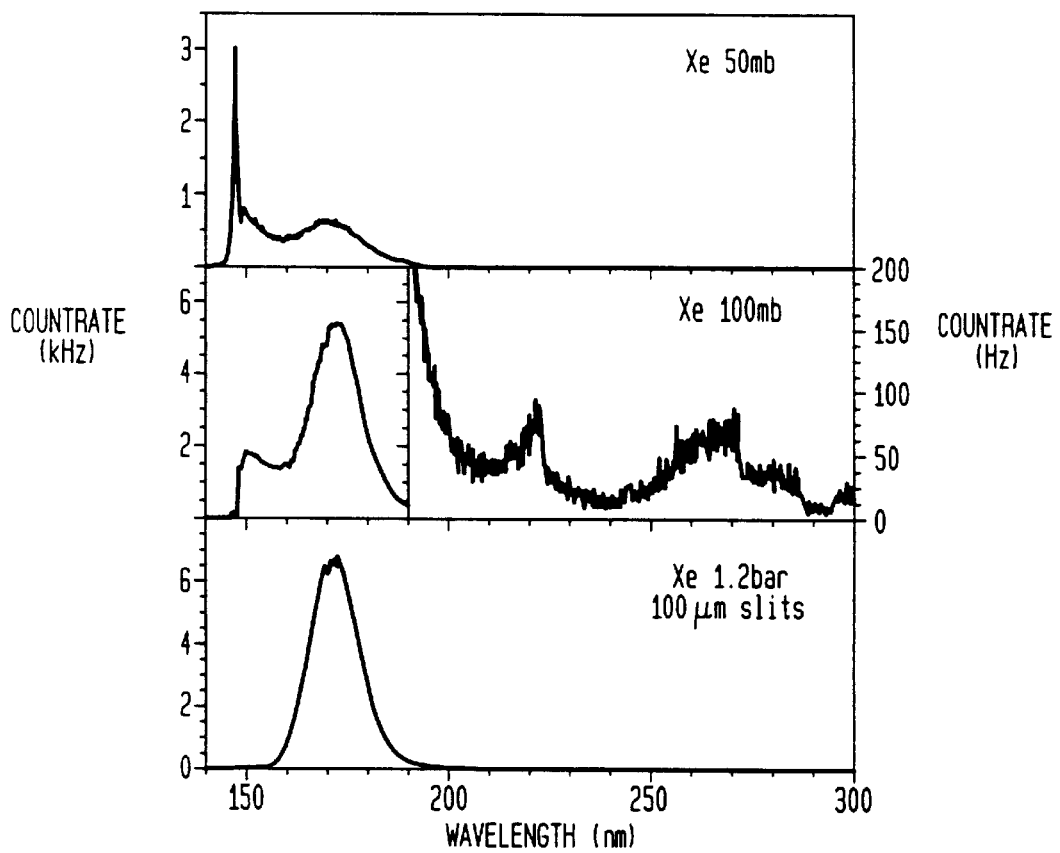

The pressure dependence of the emission is illustrated by the series of xenon spectra shown in FIG. 3. At 50 mbar the 147 nm resonance line appears in emission. The same line results in an absorption dip in the 100 mbar spectrum (FIG. 3, 100 mbar). The first continuum which corresponds to the decay of high lying vibrational levels of the $^1\Sigma_u$ and $^3\Sigma_u$ excimer molecules is more pronounced at lower pressures because optical emission before relaxation to the low lying vibrational levels corresponding to the emission of the second continuum is more likely to occur at low gas density. The same is the case for the so called left turning point which can be seen as a weak peak with a sharp long wavelength cutoff at 223 nm in FIG. 3 (100 mbar). The cutoff of left turning point of krypton and argon were observed at 175 and 155 nm, respectively. The left turning point has its name from the fact that the light of this continuum is emitted at the smallest internuclear distance of the diatomic molecule which is the left side of the potential well in the normally used energy versus internuclear distance plot. In the classical picture this corresponds to the moment when the oscillating molecule stops an inward motion and turns to expand again.

An indication of the so called third continuum, which is not yet unambiguously assigned, can in the case of the xenon be seen between 240 and 290 nm in the 100 mb Xe spectrum in FIG. 3. This point of the spectrum is shown on an enlarged scale for clarity of illustration. Very clean spectra with a high dynamic range can be measured using the table top setup described above. The low energy de-electron beam produces no background due to rf-noise, x-rays, γ-rays etc. Note that no emission or absorption of oxygen or hydrogen resonance impurity lines at 121.6 and 130.6 nm can be seen on top of the second continuum of argon as is otherwise often the case. The low noise in the spectra is illustrated by the expanded view of the wavelength region between 190 and 300 nm of FIG. 3 (100 mbar).

For application as a light source the second continua are of greatest interest. As can be seen in FIG. 3 a pressure of about one atmosphere is required for the second continua to dominate the excimer spectra. Light intensity of the second continua at the central wavelengths of 125 and 172 nm of argon and xenon is shown versus pressure in FIG. 4. The maximum conversion efficiency is reached at about 500 mbar in the case of xenon. For argon, saturation is not yet fully reached at 1.7 bars, the maximum pressure studied in this series of measurements.

Although the present invention is not limited by any theory of operation, these data may be interpreted in the following way. At low pressures excitation energy can be lost non radiatively if the electron beam reaches the walls of the cell before giving up all its energy. In the geometry used, this can occur below 200 mbar. Another geometry dependent loss mechanism at low gas density can be diffusion of light trapped in the resonance lines. These losses can also be neglected above 200 mbar if one assumes a resonance absorption cross section on the order of $10^{-12}$ cm$^2$. Also, note that already at 100 mbar the intensity in the first continuum is only a small fraction (see FIG. 3) of the integrated output of the first and second continua together so that the variation of second continuum intensity above 200 mbar cannot be attributed simply to an incomplete relaxation of the molecules.

At the higher gas densities the increase of second continuum light output can be modeled if one makes the following simplifying assumptions. In a perfectly clean gas there should be a density, and therefore pressure, independent light output because all excited atoms could cascade down to the excimer states. Now we assume a dominant quenching species, Q, interacting with a precursor of the excimer molecules which is likely to be a rare gas atom in the resonance level X*:

$$X^* + Q \rightarrow X + Q' + \Delta E \tag{1}$$

The alternative process is the excimer molecule formation:

$$X^* + 2X \rightarrow X_2^* + X + \Delta E' \tag{2}$$

This leads to the following rate equation:

$$d[X^*]/dt = \sigma[X]j - k_m[X^*][X]^2 - k_q[X^*][Q] \tag{3}$$

Figure 4:
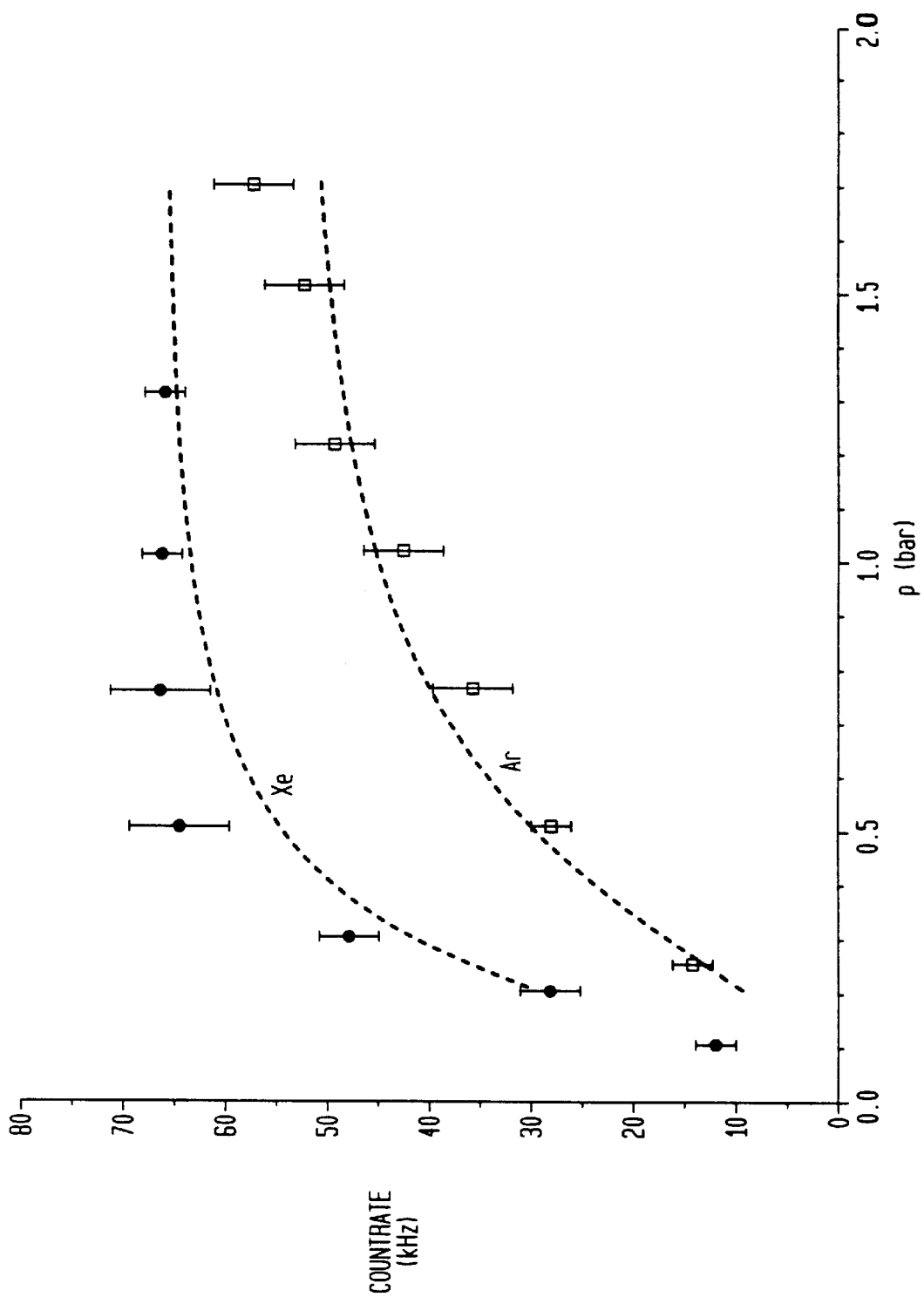
FIG. 4 is a graph depicting luminance versus pressure for two different gases.

The first term on the right hand side is the X* production rate by the electron beam with current density j and excitation cross section σ. The coefficients $k_m$ and $k_q$ are the three body molecule formation and two body quenching rate constants, respectively. The term $k_m[X^*][X]^2$ is the production rate of excimer molecules per unit volume. The measure signal shown in FIG. 4 is proportional to that rate and the size of the excited volume. Here we make the first order assumption that this volume is inversely proportional to the target density [X]. At steady state this leads to the following pressure dependence of the measure signal $I_S$ $$I_S = I_{S0}(1 - (1/k_m[X]^2/k_q[Q]+1))) \tag{4}$$

The signal $I_{S0}$ which corresponds to a situation without quenching is reached as an asymptotic limit at high densities.

A fit to the data shown in FIG. 4 results in quenching rates $k_q[Q]$ of $1.1 \times 10^5$ and $4.8 \times 10^4$ s$^{-1}$ as well as $I_{S0}$ values of 72.8 and 55.5 kHz for xenon and argon, respectively. A concentration of quenching species [Q] independent of the rare gas density [X] was assumed, based on the argument that water vapor may be the most important impurity and has a fixed vapor pressure in contact with the molecular sieve used (dewpoint=−80° C.). A gas temperature of 1000 K was used to convert pressure into particle densities. The gas temperature was estimated from a temperature dependent shift of the second excimer continuum in argon calibrated in previous experiments. The molecular rate constants $k_m$ were taken from the literature as $2.5 \times 10^{-32}$ and $-2 \times 10^{-33}$ cm$^6$/s for xenon and argon, respectively. Impurity concentrations [Q] on the order of $10^{13}$ cm$^{-3}$ result in quenching rate constants $k_q = 10^{-8}$ cm$^3$/s. Note that a constant impurity concentration is assumed. A fit assuming that [Q] scales with [X] fails to reproduce the xenon data shown in FIG. 4. In the case of argon, however, this assumption could also reproduce the experimental results.

Figure 5:
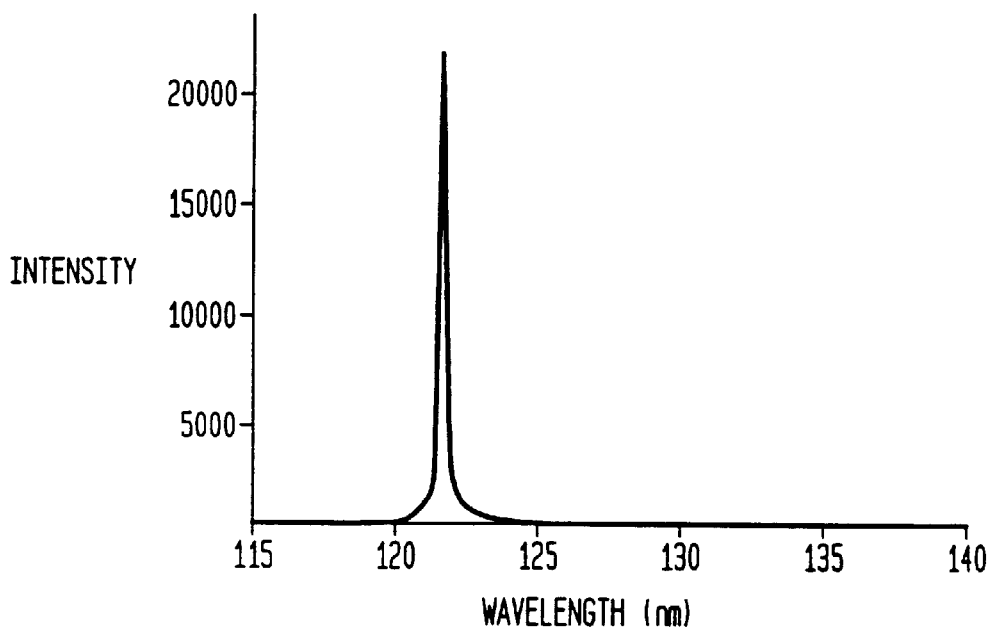
FIGS. 5 and 6 are further spectra.

With the best purification techniques used so far, an efficiency of 30% for the conversion of electron beam power into VUV-light was observed for both argon and xenon above 1 bar. This value is estimated to be accurate by ±30% with the main source of error due to the indirect sensitivity calibration of the monochromator—detector system described in section II. FIG. 5 shows that it should be possible to reach operating conditions under which the efficiency essentially reaches its theoretical limit. In this case, the light intensity is known directly from the beam current, and hence the system may be used as a standard light source for absolute sensitivity calibration purposes in the vacuum ultraviolet spectral region.

The embodiments discussed above in which the UV light is derived directly from transitions of diatomic inert gas excimers provide broadband continuum radiation. The intensity of the radiation varies continuously over a range of wavelengths, and varies only over a relatively limited dynamic range within a broad range of wavelengths. Sources of this nature are particularly useful for applications such as spectroscopy and instrument calibration. Other embodiments of the invention provide essentially monochromatic light.

In one such embodiment, the gas within chamber 10 may incorporate neon and hydrogen with or without other inert gases. Preferably, however, the gas in chamber 10 for this embodiment consists essentially of neon and hydrogen in a molar ratio of $H_2$ to Ne of about 1:1000 to about 5:1000. In this embodiment, upon application of the electron beam through foil 16, essentially monochromatic radiation at the Lyman-α line of atomic hydrogen, at approximately 121 nm wavelength results. The spectrum of the radiation (FIG. 5) consists essentially of a single peak at the Lyman-α wavelength and essentially no other VUV, UV or visible radiation. The Lyman-α peak at 121 nm has essentially the instrument-limited line width. This implies that there is no significant line broadening other than that due to doppler effect and pressure broadening. Moreover, the fluorescence efficiency is approximately 10%, i.e., approximately 10% of the electron power entering the gas is emitted in the Lyman-α peak. The 121 nm wavelength is close to the minimum wavelength which can be employed with standard optical windows and lenses. Moreover, this wavelength, unlike many other VUV wavelengths, can be transmitted efficiently through dry air as it falls near an absorption minimum of oxygen. Light at 121 nm wavelength is thus particularly useful in applications where the light must be focused as, for example, as an illuminant in photolithographic processes in the semiconductor industry. The very short wavelength reduces the diffraction limit and thus allows formation of very fine features.

The observed radiation from atomic hydrogen is believed to be due to energy transfer from $Ne_2$* excimers to molecular hydrogen. Thus, the transition energy of the $Ne_2$ released upon decay of the excimer to Ne is approximately 15 ev. This in turn is approximately equal to the sum of the dissociation energy of hydrogen molecules (about 4.4814 ev) plus the excitation energy of the first excited level of hydrogen, 10.2 ev. It is accordingly believed that efficient transfer of energy from $Ne_2$ to molecular hydrogen occurs due to the resonance between the $Ne_2$* excimer and $H_2$. Regardless of the mechanism of operation, substantially monochromatic 121 nm Lyman-α radiation of monoatomic hydrogen can be obtained by contacting $H_2$ with $Ne_2$* excimers, as by forming $Ne_2$* excimers in a gas mixture including neon and hydrogen and preferably the gas mixtures as discussed above consisting essentially of Ne and $H_2$. Thus, although the electron beam arrangement discussed above represents the preferred method of generating $Ne_2$* excimers, other methods such as intermittent arc discharges can be used where the disadvantages can be accepted. Gas mixtures consisting essentially of helium and hydrogen can be used to provide similar effects to those achieved with neon and hydrogen mixtures.

Figure 6:
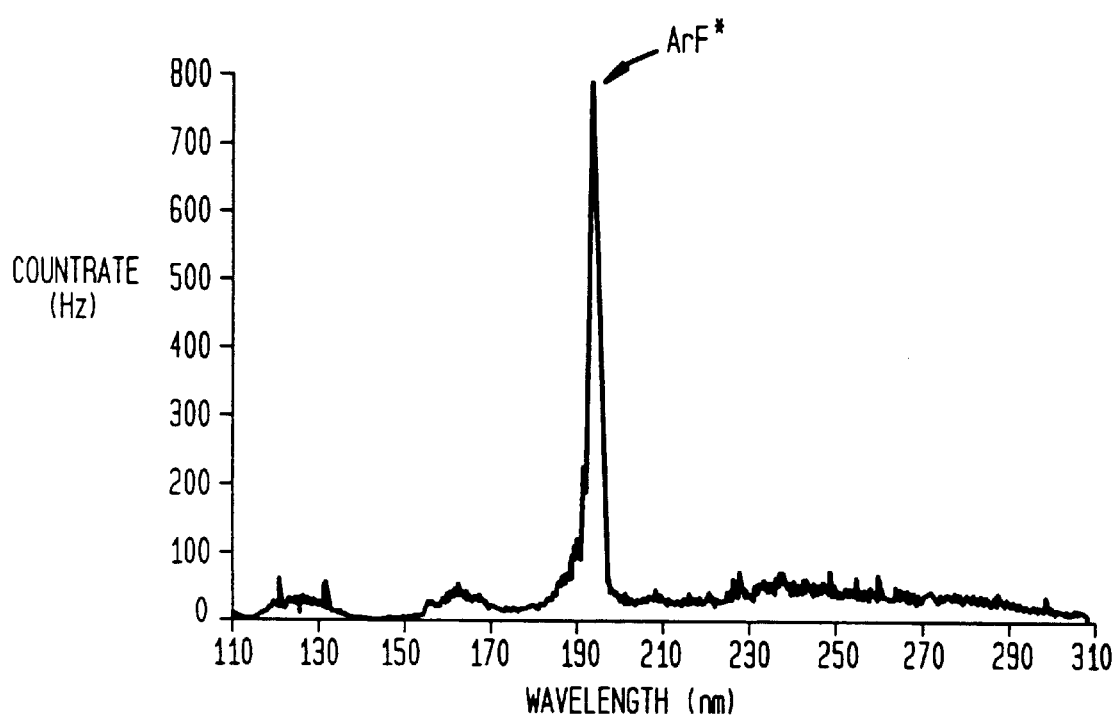

According to yet another embodiment of the invention, mixed gas excimers can be formed by directing the electron beam through a foil as discussed above in connection with FIG. 1 into a gas mixture incorporating first and second gases, preferably an inert gas and a halogen containing gas such as an uncombined halogen or a halogen containing compound. Preferred halogen containing compounds are partially or, more preferably, completely halogenated hydrocarbons such as the completely halogenated lower hydrocarbons. Fully halogenated methane is preferred. Where the halogen is fluorine, $CF_4$ is most preferred as a halogen containing second gas. Application of low energy electrons as discussed above, below above 100 kev and preferably about 5 to about 40 kev to such a gas mixture results in intense radiation at wavelengths corresponding to the fluorescence of the mixed rare gas-halogen excimer. For example, where the inert gas in the mixture is Ar and the halogen containing as is $CF_4$ or another gas containing F, intense radiation at the 193 nm wavelength of ArF* fluorescence results. A spectrum obtained by electron beam excitation of mixed Ar and $CF_4$ is depicted in FIG. 6. The mixed inert gas-halide excimers provide high fluorescent efficiencies. The ability of the present invention to provide a light source which can be operated continuously or substantially continuously at emission wavelengths of the mixed inert gas-halide excimers is particularly useful. Examples of other mixed-gas and pure gas excimers which can be employed are set for in Table II.

TABLE II

| Excimer | λ (nm) |
|---|---|
| NeF | 108 |
| $Ar_2$ | 129 |
| $Kr_2$ | 147 |
| $Xe_2$ | 172 |
| ArCl* | 175 |
| KrI* | 185 |
| ArF* | 193 |
| KrBr* | 206 |
| KrCl* | 222 |
| KrF* | 249 |
| XeI* | 253 |
| XeBr* | 282 |
| XeF* | 346 |
| $Kr_2F$* | 415 |

In each case, the gas in the emission chamber should include the constituent gases of the excimers. Of course, the gas should be free of components which quench the excimer radiation.

Figure 7:
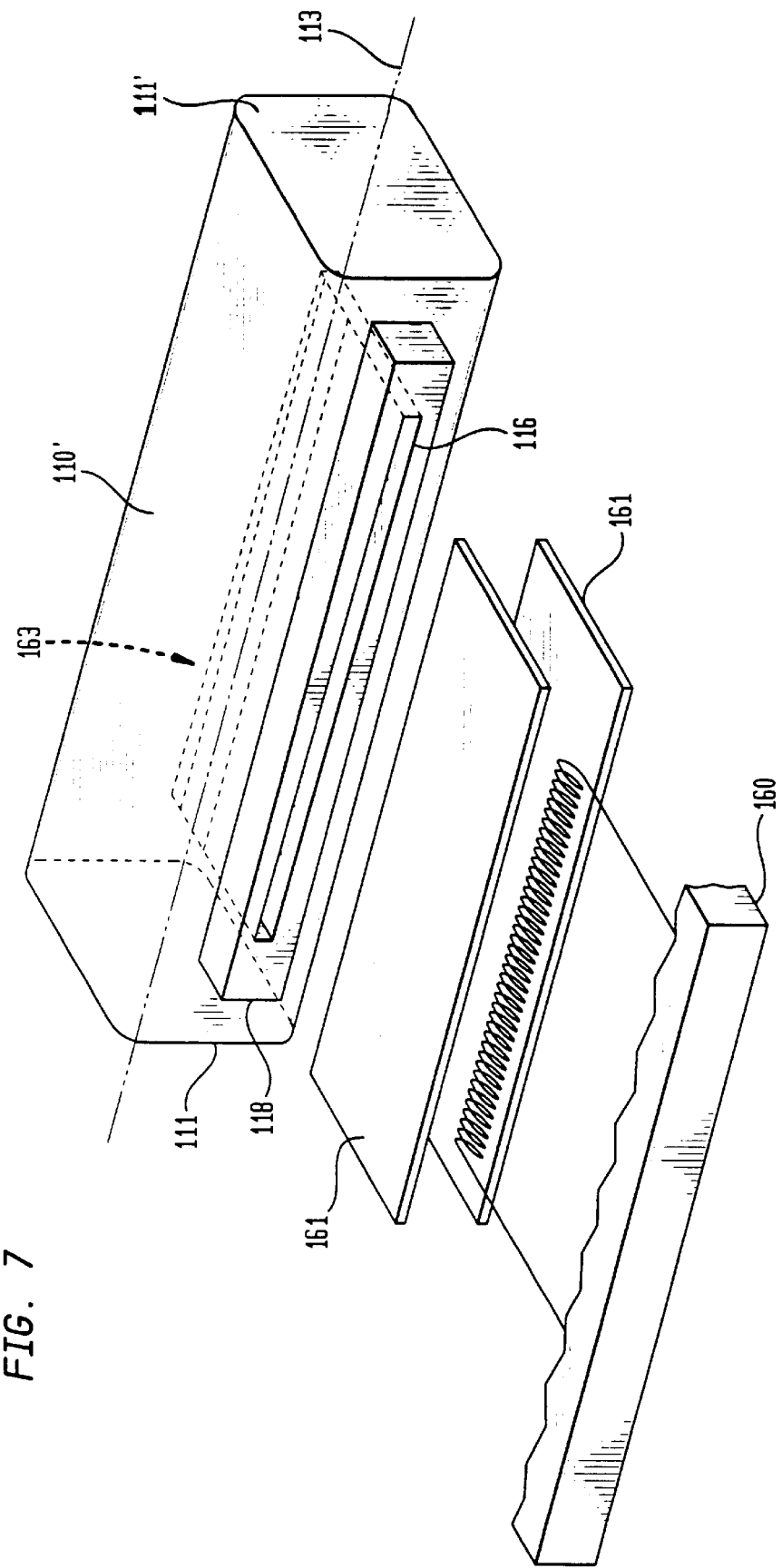
FIG. 7 is a diagrammatic perspective view depicting elements of apparatus in accordance with a further embodiment of the invention.

The physical arrangement of the component can be varied in many ways. For example, in FIG. 7, the emission chamber 110' may be an elongated structure having a pair of opposed end pieces 111 and an axis 113 extending between the ends. Frame 118 may be formed as an elongated strip of silicon disposed along the wall of the chamber and extending parallel to axis 113. Foil 116 is also in the form of an elongated strip extending parallel to the axis. The electron beam gun is housed in a beam chamber 160, portions of the beam acceleration chamber being removed for clarity of illustration in FIG. 7. The electron beam apparatus is provided with conventional beam-shaping devices such as a pair of opposed charged plates 161 housed within the beam acceleration chamber for shaping the electron beam into a flat, wide configuration having its wide dimension aligned with axis 113 and aligned with the long dimension of the striplike foil beam window 116. The electron beam gun and the electron beam window are arranged so that the flat, wide electron beam propagates into emission chamber 110 and across axis 113, thereby exciting the gas in an elongated zone 163 encompassing axis 113 as well as in other areas adjacent the sidewalls of chamber 110. This provides intense radiation along axis 113.

End pieces 111 may be partially or fully reflective so as to reflect light repeatedly along the axis and thus reflect light repeatedly through the zone excited by the electron beam. Excimers, and particularly the mixed inert gas-halide excimers are capable of lasing or emitting stimulated radiation. Because ground-state molecules corresponding to excimers are unstable, ground state molecules are not present in any appreciable quantities in the gas mixture. Thus, the excimers inherently provide a so-called inverted population, i.e., a population of molecules in which the number of excited-state molecules exceeds the number of ground state molecules. Stated another way, excimer gas mixtures typically do not self absorb the excimer radiation to any substantial degree. The light emitted by decay of one excimer molecule will not be absorbed by the corresponding ground state molecule, as the corresponding ground state molecule is not present. Therefore, if end pieces 111 are arranged to reflect the emitted radiation from the excimer back and forth along the axis, stimulated emission will occur and will provide coherent radiation at the wavelength corresponding to fluorescence from the excimers. Of course, other reflective arrangements can be used as, for example, mirrors or defraction gratings or other reflective elements disposed inside of chamber 110'. Also, reflective elements disposed outside of the chamber can be used where one or both end pieces is transparent to the emitted light. Typically, one of the reflective elements is arranged to reflect only a part of the incident radiation so that the remainder is passed outside of the system where it is employed for useful work. Alternatively, an object to be exposed to the coherent radiation can be arranged inside of chamber 110. Essentially any conventional light reflective arrangement used in the laser art can be employed. Arrangements of this nature can provide a continuously operable excimer laser as opposed to conventional pulsatile excimer lasers.

Figure 8:
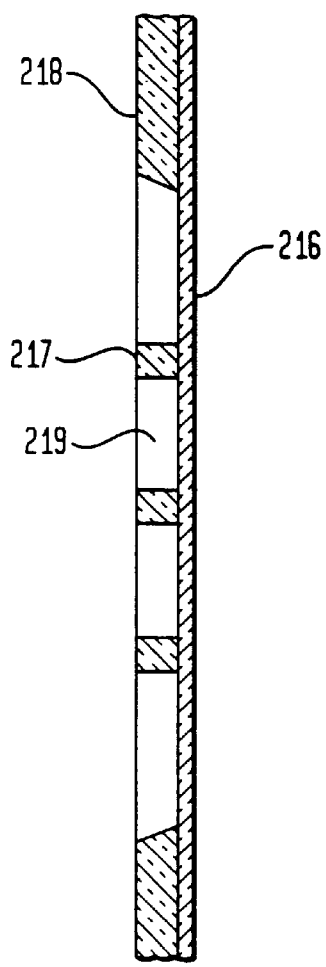
FIGS. 8 and 9 are fragmentary, diagrammatic sectional views depicting parts of apparatus in accordance other embodiments of the invention.

The electron beam window design can be varied. For example, as shown in FIG. 8, frame 218 may include a silicon wafer or a portion of a silicon wafer with silicon nitride foil 216 formed thereon as discussed above. Wafer 218 is etched in a pattern to provide reinforcing bars 217 and 219 extending in mutually orthogonal directions in a grid pattern. The reinforcing bars thus extend across the surface of foil 216 and reinforce the foil. This arrangement can provide a relatively large area as, for example, a foil about 5 mm by about 5 mm, with reinforcing bars spaced at about 1 mm intervals. Such a reinforced foil provides for a large area electron beam and thus provides excitation and emission over a relatively large volume within the emission chamber.

Figure 9:
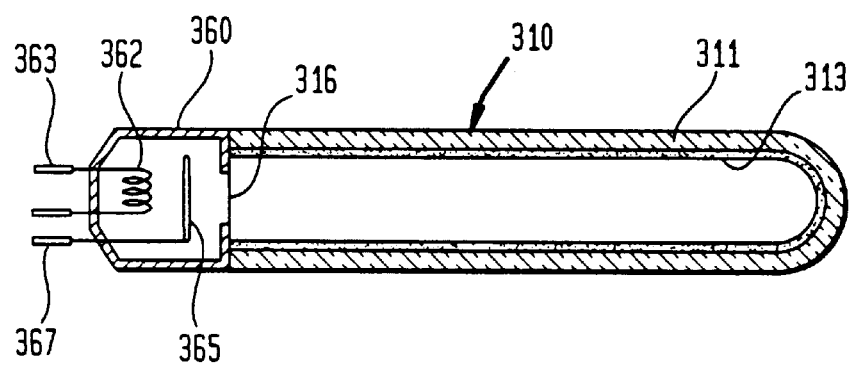

In the arrangements discussed above, radiation emitted by the gases within the chamber passes directly through a transparent portion of the chamber wall. However, a phosphor, also referred to as a scintillator, can be used to convert the radiation emitted by the gas to another wavelength. For example, numerous phosphors are sensitive to UV radiation such as VUV radiation and emit in the visible range. Such a phosphor can be disposed on the outside of a VUV transparent window such as light window 24 (FIG. 1) and can convert the emitted VUV light to a visible light. Alternatively, the phosphor can be disposed inside of the chamber. Thus, as shown in FIG. 9, the emission chamber 310 is provided in the form of a glass envelope 311 similar to the envelope of a conventional incandescent or fluorescent light bulb. A phosphor 313 is disposed on the interior of this envelope. A charge of gas such as the gases discussed above is permanently sealed within the emission chamber. Here again, the emission chamber is separated from the electron beam acceleration chamber 360 by an electron permeable foil 316. Cathode 362 is provided with pin connections 363 for engagement in a light fixture. An accelerating anode 365 may be positioned within chamber 360 or may be integral with the wall dividing chamber 360 from chamber 310 as discussed above. Anode 365 is also provided with a pin connection 367. The structure shown in FIG. 9 may be utilized as a light bulb. The socket receiving the bulb will be adapted to engage the cathode connections and anode connections and to apply voltages as discussed above to produce the electron beam. Radiation from the gas contained within chamber 310, such as VUV radiation is converted to visible light by phosphor 313 and propagates through glass envelope 311. In this arrangement, envelope 311 need not be transparent to VUV radiation and, most desirably, is not transparent to such radiation so that VUV radiation is confined within chamber 310. Other visible light transparent materials can be employed for chamber 310. The pin connections illustrated can be replaced by any other convenient type of electrical interconnections.

In the arrangements discussed above, the cathodes utilized have been heated, thermionic emission cathodes. Other types cathodes, such as field-emission cathodes can be employed. Typical field emission cathodes include numerous sharp points arranged so that upon application of an electric field the field is concentrated at the points and electrons are emitted from the points. Field emission cathodes typically do not require heating.

The devices discussed above can be operated continuously or substantially continuously, with a substantially constant beam current for an appreciable interval, such as milliseconds or more. By contrast, devices such as conventional pulsed excimer lasers emit for intervals of microseconds or less. Moreover, the devices discussed above can operate at a relatively high duty cycle, preferably about 10% or more. As used in this disclosure with reference to a light-emitting device, the term "duty cycle" means the ratio of the time the device was actually emitting light to the elapsed time from the beginning of the first emission to the end of the last emission. Conventional pulsed excimer lasers operate at duty cycles far below 10%, and typically below 1%. The upper limit on the beam current and duty cycle typically is set by heating of the electron permeable film. Very high beam currents can heat the file to destruction. To alleviate heating problems, it is desirable to spread the beam current over a relatively large area of foil as, for example, by using large, reinforced window structures as depicted in FIG. 8. In these structures, the reinforcing members 217 and 219 also serve as conductors for removing heat from the foil and thus further alleviate foil heating.

In all of the arrangements discussed above, the light emitted by the excimers, or by other species interacting with the excimers, is the desired end product. However, these techniques can also be employed for purposes other than light generation as, for example, for promoting chemical reactions by providing transient species. For example, the methods discussed above using hydrogen and neon also serve to provide monatomic hydrogen as a transient species which can be used in chemical reactions. The process forms excited-state monatomic hydrogen as a metastable, transient species, which is highly reactive. This metastable species yields ground-state monatomic hydrogen, another reactive, transient species, upon emission of the Lyman-α radiation. Under the preferred conditions discussed above, it is believed that the process can provide monatomic hydrogen at a concentration of about $10^{12}$ atoms/cm$^3$, which is greater than the concentrations normally achieved in plasma processes for making monatomic hydrogen. Alternatively, the processes discussed above using a pure inert gas can be modified to retard excimer formation, by operating the processes at a lower partial pressure of the inert gas, below about 100 mbar and more preferably below about 50 mbar, thereby reducing the density of the inert gas in the system. The reduced rate of excimer formation favors stability of the metastable excited-state inert gas atoms. These excited-state atoms can be used as transient species to transfer energy to other species in a chemical reaction. A workpiece to be treated with these species can be disposed within the emission chamber. Also, where the transient species have an appreciable lifetime, the gas mixture can be piped from the emission chamber to the workpiece to deliver the transient species to the workpiece.

As these and other variations and combinations of the features discussed above can be utilized without departing from the present invention, the foregoing description of the preferred embodiment should be taken by way of illustration rather than by limitation of the claims.

What is claimed is:

1. A component for an electron-beam excited gas laser comprising:
   (a) an emission chamber having opposite ends and means for reflecting light of a selected wavelength at said ends so that light of said selected wavelength will pass repeatedly along a predetermined path in an axial direction between said ends; and
   (b) an electron beam window partially bounding said chamber, said beam window being substantially transparent to a low-energy electron beam having energy less than about 100 KeV, said beam window being configured and aligned with said predetermined path so that an electron beam may be introduced into said chamber and pass through an elongated excitation zone within said chamber encompassing said predetermined path.

2. A component as claimed in claim 1 wherein said beam window extends along a wall of the chamber in an axial direction parallel to said path.

3. A component as claimed in claim 2 wherein said beam window is in the form of an elongated strip extending in said axial direction.

4. A laser comprising a component as claimed in claim 3 and an electron beam gun adapted to produce a flat electron beam having a wide dimension aligned with said strip.

5. A laser comprising a component as claimed in claim 1 and an electron beam gun adapted to produce an electron beam and direct said electron beam into said window.

6. A laser as claimed in claim 5 further comprising a gas mixture comprising an inert gas and a halogen-containing gas in said chamber.

7. A component as claimed in claim 1 wherein said electron beam window is substantially transparent to an electron beam having energy between about 5 KeV and about 40 KeV.

8. A component as claimed in claim 1 wherein said electron beam window is substantially transparent to an electron beam having energy of about 10 to about 30 KeV.

9. A component as claimed in claim 1, wherein said electron beam window is substantially transparent to an electron beam having energy of about 20 KeV.

10. A method of operating a laser comprising the steps of forming mixed excimers of an inert gas and a halogen by directing electrons at energies of less than about 100 KeV into a gas mixture comprising the inert gas and halogen through a ceramic electron beam window, whereby said mixed excimers will decay and emit light at a predetermined fluorescence wavelength, and repeatedly reflecting light at said wavelength through said gas mixture.

11. A method as claimed in claim 10 wherein said directed electrons constitute the sole source of excitation energy applied to said gas mixture.

12. A method as claimed in claim 10 wherein said directed electrons have energy between about 5 KeV and about 40 KeV.

13. A method as claimed in claim 10 wherein said directed electrons have energy of about 10 to about 30 KeV.

14. A method as claimed in claim 10 wherein said step of repeatedly reflecting light is performed so as to reflect the light along an axis and said step of directing electrons into the gas mixture is performed so as to direct the electrons into the gas mixture transverse to said axis.

15. A method as claimed in claim 14 wherein said step of directing electrons is performed so as to provide the directed electrons in a beam having a width dimension and a thickness dimension less than the width dimension, the width dimension of the beam being aligned with said axis.

16. A method as claimed in claim 10 wherein said gas mixture is at a pressure of at least about 0.5 bar.

17. A method as claimed in claim 10 wherein said gas mixture is at about atmospheric pressure or more.

18. A method of operating a laser comprising the steps of providing a gas mixture including one or more an inert gasses and pumping the gas mixture by directing electrons at energies of less than about 100 keV into the gas mixture so that the gas mixture emits light at a predetermined wavelength, and repeatedly reflecting light at said wavelength through said gas mixture.

* * * * *

UNITED STATES PATENT AND TRADEMARK OFFICE
CERTIFICATE OF CORRECTION

PATENT NO. : 6,282,222 B1
DATED : August 28, 2001
INVENTOR(S) : Jochen Wieser, Andreas Ulrich, Daniel E. Murnick and Werner Krotz It is certified that error appears in the above-identified patent and that said Letters Patent is hereby corrected as shown below:

Column 3,
Line 26, "first as" should read -- first gas --.
Line 47, "at lest" should read -- at least --.
Line 62, "is a least" should read -- is at least --.

Column 4,
Line 15, "Components according" should read -- Component according --.
Line 24, "meads for" should read -- means for --.
Line 31, "gases for" should read -- gases to --.

Column 5,
Line 7, "A par-" should read -- Par- --.

Column 7,
Line 26, "top wire" should read -- to wire --.

Column 9,
Line 37, "current rate" should read -- count rate --.
Line 48, "continuum' actually" should read -- continuum," actually --.

Column 10,
Line 51, "so called" should read -- so-called --.
Line 54, "so called" should read -- so-called --.

Column 11,
Line 6, "so called" should read -- so-called --.
Line 8, "of left" should read -- of the left --.
Line 9, "point of" should read -- points of --.
Line 17, "so called" should read -- so-called --.

UNITED STATES PATENT AND TRADEMARK OFFICE
CERTIFICATE OF CORRECTION

PATENT NO. : 6,282,222 B1
DATED : August 28, 2001
INVENTOR(S) : Jochen Wieser, Andreas Ulrich, Daniel E. Murnick and Werner Krotz It is certified that error appears in the above-identified patent and that said Letters Patent is hereby corrected as shown below:

Column 12,
Line 17, "$I_{50}$" should read -- $I_{SO}$ --.
Line 18, "$I_{50}$" should read -- $I_{SO}$ --.
Line 21, "$I_{50}$" should read -- $I_{SO}$ --.

Column 14,
Line 2, "as is" should read -- gas is --.

Column 16,
Line 33, "the file" should read -- the film --.

Column 18,
Line 38, "more an inert" should read -- more inert --.

Signed and Sealed this

Sixteenth Day of April, 2002

Attest:

*Attesting Officer*

JAMES E. ROGAN
*Director of the United States Patent and Trademark Office*